INVENTOR
Rex E. Wells.
BY
ATTORNEYS.

Dec. 5, 1933.                 R. E. WELLS                 1,938,201
                              TRANSMISSION
                          Filed Dec. 16, 1930          5 Sheets-Sheet 4

INVENTOR
Rex E. Wells.
BY
ATTORNEYS.

Dec. 5, 1933.  R. E. WELLS  1,938,201
TRANSMISSION
Filed Dec. 16, 1930   5 Sheets-Sheet 5
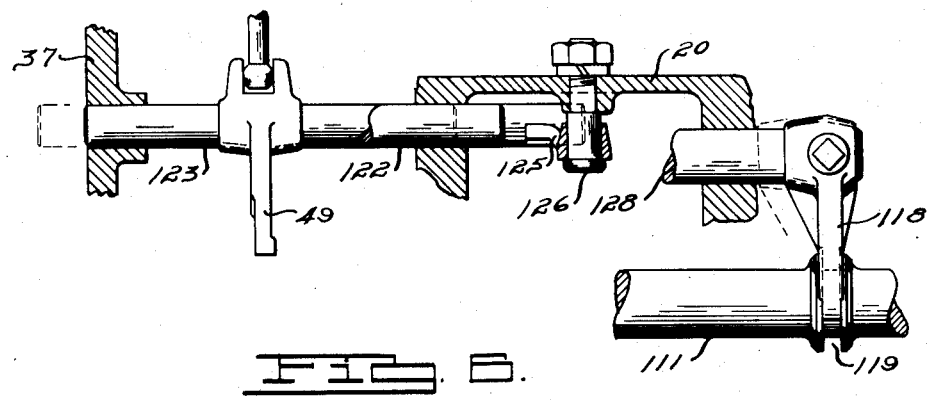
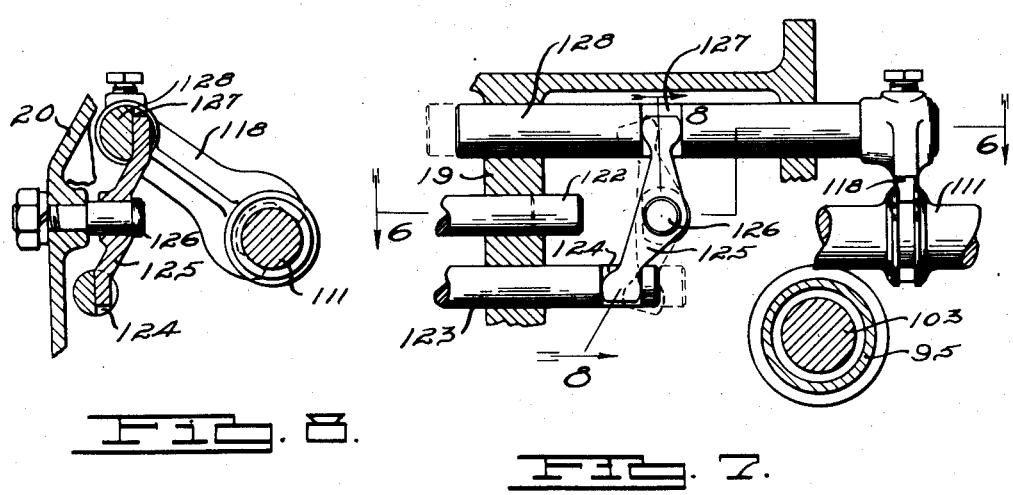
INVENTOR
Rex E. Wells.
BY
ATTORNEYS.

Patented Dec. 5, 1933

1,938,201

UNITED STATES PATENT OFFICE 1,938,201

TRANSMISSION

Rex E. Wells, Detroit, Mich., assignor to Resengin, Inc., a corporation of Michigan Application December 16, 1930
Serial No. 502,765

7 Claims. (Cl. 74—57)

This invention relates to a unitary transmission and differential mechanism particularly useful for motor vehicles of the front wheel drive type.

The main objects of this invention are to provide an improved transmission mechanism of compact nature and relatively great strength; to provide such a mechanism which is simple in construction and easily assembled; to provide such a mechanism which utilizes a hypoid drive and which secures a direct drive to the differential pinion in high gears; to provide a mechanism of this character in which a pinion for the ring gear is located at the side of the ring gear opposite to the drive shaft from the motor; to provide a transmission mechanism in which the space occupied by the various change speed gears has been reduced to a minimum; to provide unitary mechanism of this character in which the reverse and speed reduction gears are located at the side of the differential opposite to the drive shaft from the motor; to provide a transmission mechanism in which both the pinion and countershafts are provided with rigidly mounted gears and with slidably splined gears, the slidably splined gears on each of the shafts being shiftable into and out of mesh with the rigid gears on the respective other shafts; to provide a transmission mechanism in which the reverse idler gear is in constant mesh with a slidably splined gear on the countershaft; to provide a transmission mechanism in which the second speed gears are in constant mesh so that the teeth may be of spiral formation to eliminate noise; to provide a transmission mechanism in which a clutch member for a journalled constant mesh gear is combined with a driving gear for the reverse idler; and to provide a unitary construction of differential and transmission gears and shafts in which the differential case hub may be of amply large size to withstand the strains and stresses to which it is subjected without requiring an unusually large housing for the mechanism.

An illustrative embodiment of this invention is shown in the accompanying drawings, in which—

Fig. 5 is a sectional view taken on the line 5—5 of Fig. 3 looking in the direction indicated.

Fig. 6 is a fragmentary sectional view taken on the line 6—6 of Fig. 7.

Fig. 7 is a fragmentary view partly in section and partly in elevation showing the relative positions of the shifter bars, high speed direct drive shaft and axle shaft.

Figure 1:
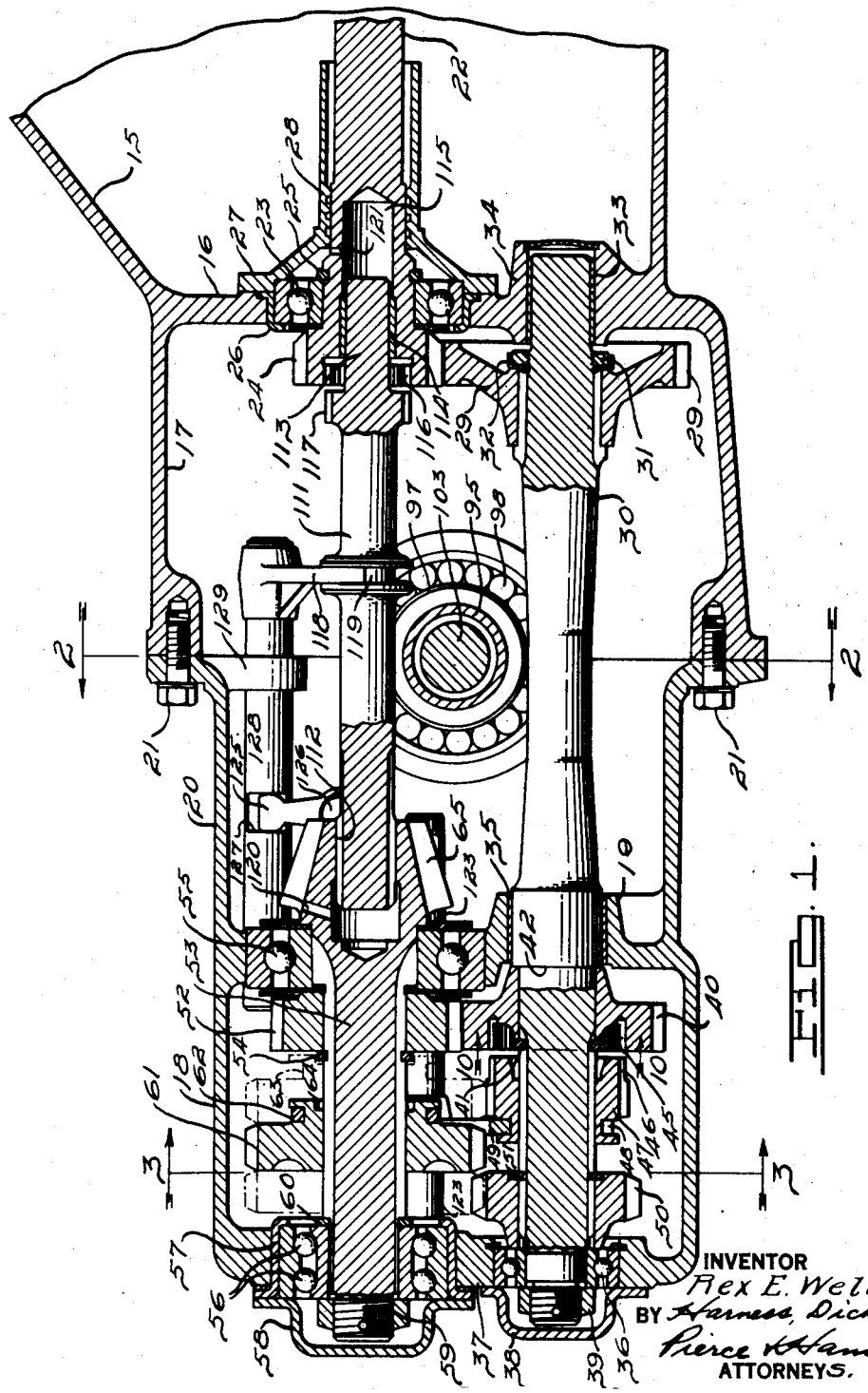
Fig. 1 is a view taken in substantially vertical longitudinal section of the combined transmission and differential mechanism as indicated by the line 1—1 of Fig. 3.

In the construction shown in the drawings, a clutch housing 15 is provided with a rear wall 16 integrally formed therewith and beyond which projects an integrally formed housing 17 which forms substantially one-half of the differential housing. A transmission gear housing 18, having an end wall 19, is provided with a housing 20 integrally formed therewith and extending therebeyond which forms the other portion of the differential housing. These two housings, which have faces complementary to each other are joined in a vertical plane which is parallel with and contains the axis of the oppositely extending axle shafts by suitable means such as cap screws 21.

A power drive shaft 22 is journaled by ball bearings 23 in the wall 16, with the end of the shaft extending into the differential housing and terminating in a gear 24 integrally formed thereon. The inner race of the bearing 23 is secured on the shaft 22 by a spring snap ring 25 and the outer race is received in a cup 26 which together with the outer race is retained in the wall 16 by the flange 27 of a sleeve 28 which surrounds the shaft adjacent the bearing in the usual and customary manner.

The gear 24, which preferably has teeth of helical formation, meshes with a similarly formed gear 29 which is splined to a countershaft 30 and secured thereon by a nut 31 and lock washer 32. The adjacent end of the countershaft 30 protrudes beyond the gear 29 and is journaled in a relatively thin sleeve 33 of bearing material mounted in a bearing hub or support 34 which is integrally formed in the housing wall 16.

The countershaft 30 extends across the differential casing, through the housing wall 19 and across the transmission housing 18 in spaced parallel relation to the drive shaft 22. The housing wall 19, at the point where the countershaft extends through it, is provided with a relatively thin sleeve 35 of bearing material, in which an enlarged portion of the shaft is journaled. The end of the countershaft 30 which extends into the transmission case is journaled in a ball bearing 36 which is mounted in the outer end wall 37 of the transmission case 18. The bearing 36 is retained by a cap 38 which covers a protruding threaded end of the shaft, said threaded end being provided with a nut 39 which retains the inner race of the bearing 36 on the end of the shaft in the usual and customary manner.

Figure 10:
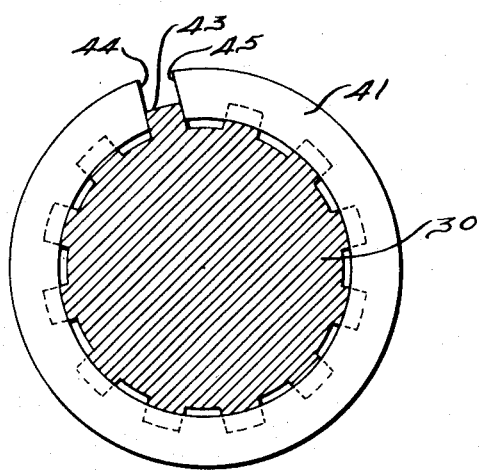
Fig. 10 is an enlarged sectional view taken on the line 10—10 of Fig. 1, looking in the direction indicated.
Figure 3:
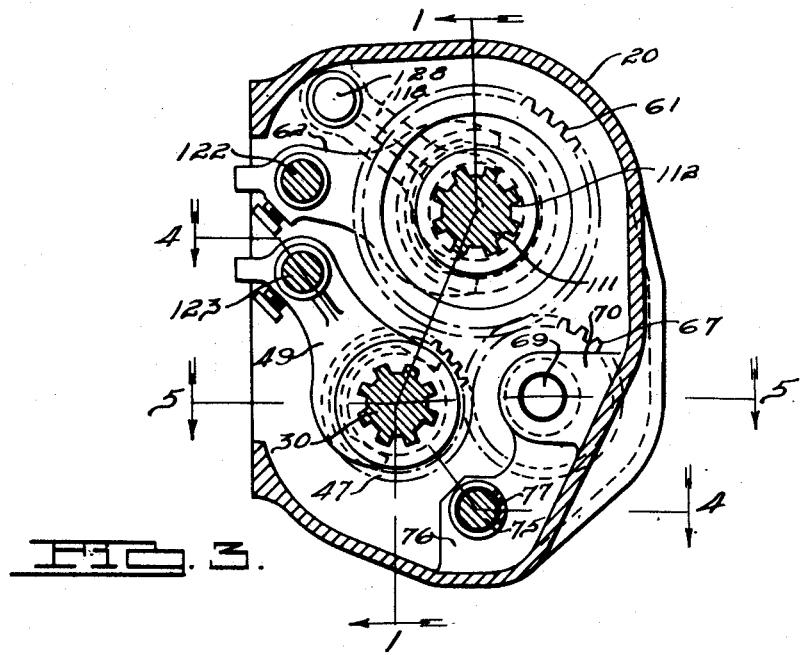
Fig. 3 is a transverse sectional view taken on the line 3—3 of Fig. 1 looking in the direction indicated.

That part of the countershaft 30 which extends across the transmission case 18 and closely adjacent to the end wall 19 has a gear 40 journaled thereon and retained by a snap ring 41 and a shoulder 42 integrally formed on the shaft adjacent the enlarged portion which is journaled in the bearing 35. As shown most clearly in Figs. 1 and 10 of the drawings, the shaft 30 is splined from a point slightly beyond the snap ring 41 to the adjacent end thereof and in cutting the seat through the splines for the snap ring 41, one of the splines 43 is not milled away so that the spaced ends 44 and 45 of the snap ring 41 abut against the spline 43 for preventing rotation of the snap ring through frictional contact with the journaled gear 40.

The journaled gear 40 has one side thereof cut away to provide a plurality of internal clutch teeth 45 which are adapted to clutch with a series of external complementary clutch teeth 46 integrally formed on one side of a gear 47. The gear 47 is slidably splined on the countershaft 30 closely adjacent to the journaled gear 40. The side of the gear 47 opposite to the clutch teeth 46 is provided with a peripheral groove 48 which receives a shift fork 49 for sliding the gear axially on the shaft.

The countershaft 30 is also provided, closely adjacent the outer housing wall 37, with a rigidly mounted gear 50 splined thereon and secured against axial movement in one direction by snap ring 51 and against axial movement in the opposite direction by abutting the inner race of the ball bearing 36, said inner race being rigidily held on the shaft by the nut 39.

The gear 40, which is also preferably of helical tooth construction, constantly meshes with a similarly formed gear 52 rigidly splined on a pinion shaft 53 and retained against an integrally formed shoulder thereon by a snap ring 54. The pinion shaft 53 is journaled adjacent one end on an annular ball bearing 55 and at the other end on a double annular ball bearing 56. The bearing 56 is mounted in the end wall 37 of the housing 18 by a cup 57 and a cover cap 58 in the usual manner, the end of the shaft having a nut 59 threaded thereon for retaining the inner race of the bearing against a shoulder on the pinion shaft. The pinion shaft 53 is splined for substantially its entire length and a bearing washer 60 is interposed between the inner side of the inner bearing race and the abutting ends of the splines thereby providing a suitable area of bearing face for the inner race.

The pinion shaft 53 is also provided with a gear 61 slidably splined thereon which is adapted to be shifted in both axial directions from a neutral position by a shifter fork 62 which is embraced in a suitable peripheral groove 63 integrally formed on one side of the gear. The side of the gear 61 adjacent to the snap ring 54 is undercut at 64 so as to have suitable clearance with the snap ring when shifted toward it as shown in dotted outline in Fig. 1 of the drawings.

The end of the shaft 53 extends beyond the bearing 55 so as to protrude into the differential housing, said end being provided with a pinion gear 65 integrally formed therewith which meshes with a ring gear 66. The teeth on the ring gear and pinion are of the hypoid type.

The transmission housing is also provided with a reverse gear 67 which is journaled on a sleeve 68 of bearing material supported on a shaft 69, one end of which is mounted in the housing wall 19 and the other end of which is mounted in an inwardly extending boss or lug 70 integrally formed on the transmission housing 18. The reverse gear 67 constantly meshes with the axially slidable gear 47 which is splined to the countershaft 30 and is adapted to mesh with the pinion shaft slidably splined gear 61 when said gear is shifted to the right to the dotted position shown in Fig. 1 of the drawings.

This transmission and differential mechanism is particularly adapted for front wheel drives in motor vehicles and means are provided for manually cranking the motor through the transmission mechanism and engaged clutch of the motor and comprise a crank clutch jaw 71 threaded to the outer end of a hollow shaft 72 which is journaled in a bushing 73 mounted in the housing wall 37. The shaft 72 carries a gear 74 rigid thereon within the transmission casing and has a reduced inner end 75 which is journaled and axially slidable in an inwardly extending boss 76 integrally formed on the housing in spaced relation to the end wall 37. The reduced end 75 is surrounded by a helical compression spring 77 interposed between the boss 76 and the adjacent face of the gear 74 for normally urging the gear and the shaft to the position shown in full lines in Fig. 4, in which position the gear 74 is in spaced relation to the countershaft rigidly mounted gear 50.

Figure 4:
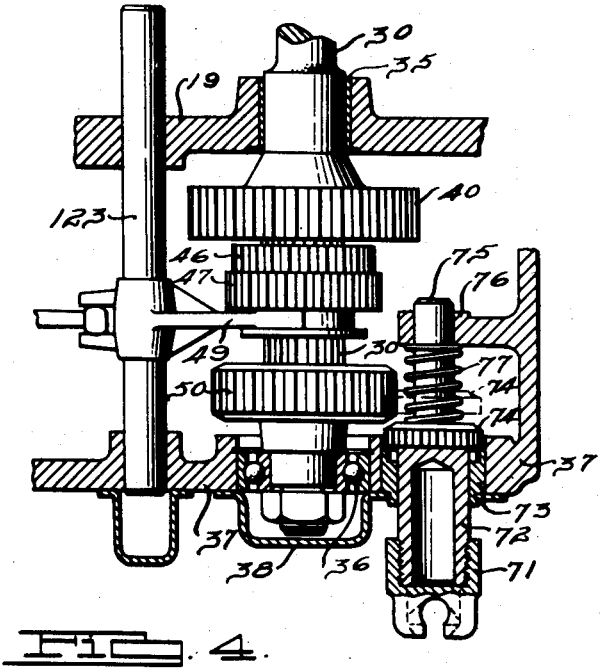
Fig. 4 is a sectional view taken on the line 4—4 of Fig. 3 looking in the direction indicated.

When a hand crank is inserted into the clutch jaw 71 and the shaft 72 moved axially inwardly against the action of the spring 77 the gear 74 slides into mesh with the fixed countershaft gear 50 as shown in dotted outline in Fig. 4, thus permitting the motor to be cranked through the countershaft 30, constantly meshing gears 29 and 24 and clutch shaft 22.

Figure 2:
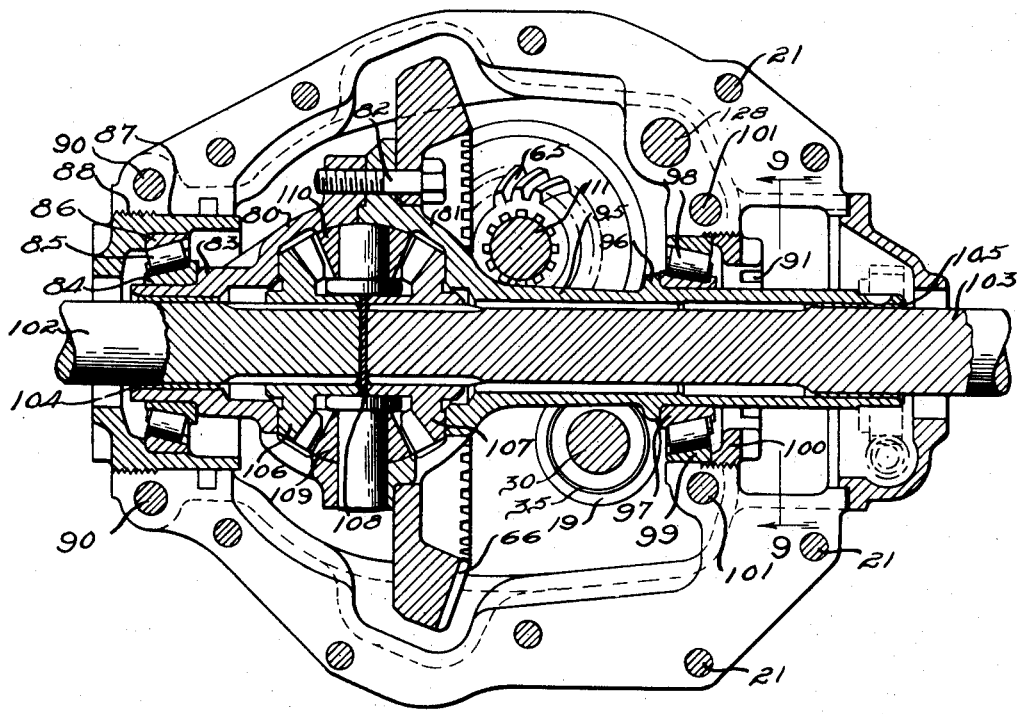
Fig. 2 is a view taken on the line 2—2 of Fig. 1 looking in the direction indicated.
Figure 9:
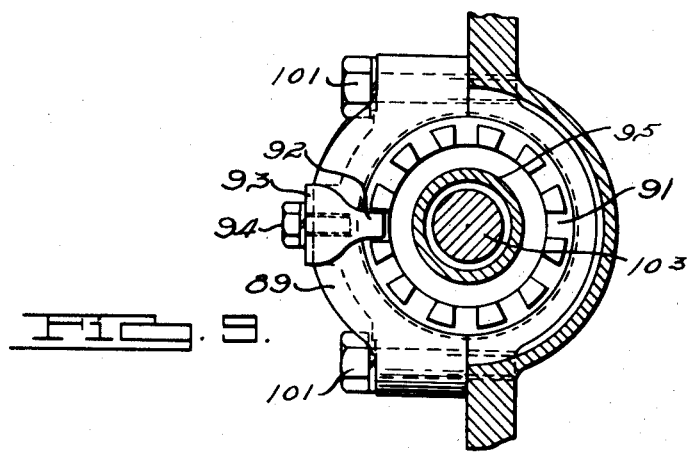
Fig. 9 is a fragmentary sectional view taken on the line 9—9 of Fig. 2 looking in the direction indicated.
Figure 8:
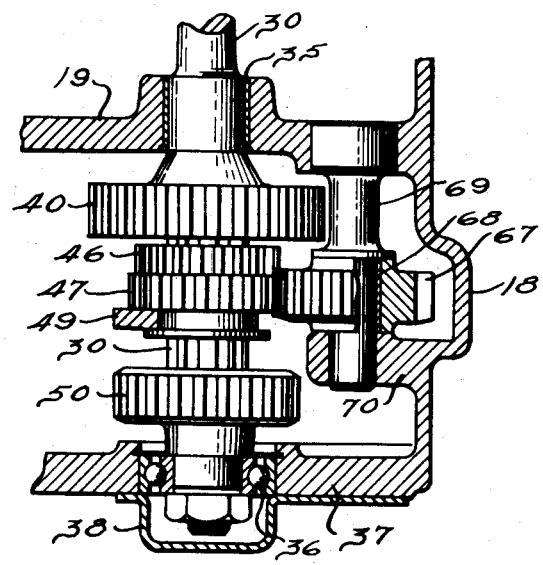
Fig. 8 is a fragmentary sectional view taken on the line 8—8 of Fig. 7, looking in the direction indicated.

The ring gear 66 is secured to a two-piece differential case comprising semi-spherical shaped portions 80 and 81 which have outwardly extending parallel flanges through which suitable cap screws or the like 82 are fastened, the cap screws holding the ring gear to the differential case as well as holding the two halves of the differential case together. The differential case portion 80 is provided with a hub 83 to which is fitted the inner race 84 of roller bearings 85. An outer race 86 for the roller bearings is carried by a cup-shaped adjusting nut 87 which is threaded at 88 into a semi-circular recess of the differential housing and into a cap of substantially the same construction as that shown in Fig. 9, and which is secured to the housing by cap screws 90, shown in section in Fig. 2.

The differential case member 81, preferably of a forging, has a relatively long hub 95 which is provided with an annular shoulder 96 on the outer periphery thereof against which abuts the inner race 97 of a roller bearing 98. The outer race 99 of the bearing is axially slidable and abuts against the inner face of an adjusting nut 100 which is threaded partially into a semi-circular recess provided in the housing and into a cap 89 which is secured to the housing by cap screws 101.

The cap 89 is adapted to snugly grip the bearing adjusting nut 100 so that the cap may be loosened slightly in order to adjust the nut. The outer face of the nut is provided with a plurality of spaced notches 91 which are adapted to receive the inwardly extending finger 92 of a clip 93. The clip 93 is secured to the cap 89 by a cap screw 94, so that the finger 92 prevents rotation of the adjusting nut from a desired position.

The hubs 83 and 95 of the differential case are, of course, in axial alignment and have axle shafts 102 and 103 respectively, extending therethrough in spaced relation, relatively thin bushings 104 and 105 respectively being interposed between the shafts and hubs adjacent the outer ends. The inner ends of the axle shafts 102 and 103 are splined into bevel differential gears 106 and 107 respectively in the usual manner. A disc of relatively hard material, such as hardened steel 108 is interposed between the adjacent ends of the axle shafts and against which the shafts abut. The disc 108 is retained in fixed position by reason of having its marginal edge abuttingly embraced by the adjacent ends of the differential gear hubs. The axle shaft gears 106 and 107 each mesh with bevel pinions 109 and 110 in the usual manner.

The drive shaft 22 and pinion shaft 53 are in spaced axial alignment with each other and means are provided for directly connecting the two shafts together and comprise an intermediate shaft 111, one end of which is splined at 112 into an axially extending splined bore in the end of the pinion 65 and the other end of which, 113, is piloted in a bushing 114 carried in an axially extending bore 115 formed through the gear 24 and into the drive shaft 22. The inner side of the gear 24 is undercut to provide a series of internal clutch teeth 116 and the shaft 111 is provided with a plurality of integrally formed radially extending clutch teeth 117 which are adapted to interfit with the clutch teeth 116 to clutch the two members together.

Means are provided for shifting the intermediate shaft 111 axially to engage or disengage the clutch teeth 117 with the clutch teeth 116 and comprise a shifter yoke 118 having a bifurcated end for fitting between the side walls of a peripheral groove 119 formed by radially extending shoulders integrally formed on the shaft. The rear end of the bore extending into the pinion and pinion shaft is provided with a small aperture 120 which provides communication between said bore and a space between two of the teeth on the pinion for permitting the escape of air or oil which might otherwise be entrapped in the bore and thus resist axial shifting of the intermediate shaft 111. The inner end of the bore 115 is similarly provided with an aperture 121 for serving the same function with respect to its bore.

As shown most clearly in Figs. 3, 4, 6, 7 and 8, the shifter yoke 62 for the pinion shaft slidably splined gear 61 is mounted on a longitudinally extending shift bar 122 in the usual manner. The shifter fork 49 for the countershaft slidably splined gear and clutch member 47 is mounted on a shifter bar 123 positioned in spaced parallel relation below the bar 122. The bar 123 extends through the end wall 19 of the transmission housing and projects into the differential case and said projecting end is provided with a transversely extending notch 124 which receives one end of a substantially vertically disposed lever 125. The lever 125 is pivotally mounted on a pin 126 mounted in the side wall of the housing portion 20. The other end of the lever 125 is embraced in a notch 127 formed transversely in a third shifter bar 128 which is axially slidable in the housing wall 19 and a lug 129 integrally formed on the housing 20. The shaft extends through the lug 129 and the protruding end thereof has the shifter fork 118 rigidly connected thereto.

Referring to Fig. 1 of the drawings, it will be noted that the portion of the countershaft 30 contained within the differential housing is tapered from both ends toward the middle with the most slender part thereof most closely adjacent to the differential case hub. This construction permits a very compact disposition of the respective gears and parts with a small over-all size of housing and at the same time gives some flexibility or cushioning effect to the drive when power is being transmitted through the countershaft.

It is also to be noted that the intermediate shaft 111 is subjected only to torque from the drive shaft 22 and is not subjected to any side strains as would be the case if this intermediate shaft carried any transmission gears. With this arrangement the intermediate shaft may also be of relatively slender construction which permits a compact disposition of the various units and at the same time permits the formation of a differential case hub of ample diameter to withstand the bending strains to which it is subjected by reason of the supporting bearing 98 being located remotely with respect to the differential case composed of the parts 80 and 81.

In the operation of this mechanism, power is applied to the drive shaft 22 from the clutch of the internal combustion motor or other suitable source to rotate the gear 24 which is in constant mesh with the rigid countershaft gear 29.

When it is desired to drive the ring gear through low speed gear ratio the pinion shaft slidably splined gear 61 is shifted by its fork 62 to the dotted position shown at its left in Fig. 1 of the drawings, which brings the teeth thereon into mesh with the teeth of the countershaft rigid gear 50. When these gears are in mesh, the pinion shaft is rotated at low speed causing the pinion thereon to drive the ring gear at the speed ratio determined through the reduction of the gears 50 and 61 and gears 24 and 29.

When it is desired to drive the ring gear at intermediate speed, the countershaft slidably splined combined gear and clutch member 47 is shifted to the right from the position shown in Fig. 1 of the drawings, causing the clutch teeth 46 to engage and mesh with the internal clutch teeth 45 on the journaled gear 40 thus clutching the gear 40 to the countershaft. When this clutch is engaged the pinion 65 is then driven at the speed ratio as determined by the gears 52 and 40 and gears 24 and 29.

When it is desired to have direct drive with a 1:1 ratio between the pinion 65 and drive shaft 22, the intermediate shaft 111 is shifted to the right as viewed in Fig. 1 of the drawings to bring the external clutch teeth 117 into mesh and engagement with the internal clutch teeth 116, thus connecting the pinion through the splined end 112 directly to the drive shaft.

The intermediate shaft 111 is shifted by the yoke 118 mounted on shifter bar 128 and it is to be noted that this bar is interconnected through lever 125 to the shifter bar 123 so that when the bar 123 is moved axially in one direction, the bar 128 will move axially in the opposite direction and vice versa. This arrangement permits the use of a standard shift in which the bar 123 is shifted in one direction for intermediate speed and in the opposite direction for high speed gear ratio.

The reverse idler gear 67 has a sufficient width of face so that it will remain in constant mesh with at least a portion of the face of gear 47 at all times when the gear 47 is shifted in both directions from the position shown in Figs. 1 and 5 of the drawings. When in neutral position the gear 47 is in full mesh with the reverse idler 67 as shown in Fig. 5.

When it is desired to have a reverse drive to the pinion and ring gear mechanism, the pinion shaft slidably splined gear 61 is shifted to the dotted position shown to the right of its full line position in Fig. 1, in which position the teeth thereof mesh with the teeth of the reverse gear 67.

When in this position, the drive from the shaft 22 is through the gears 24 and 29 to the countershaft 30, from the countershaft 30 through the gear 47, reverse gear 67, pinion shaft gear 61 to the pinion 65, which turns in the reverse direction by reason of the interposed gear 67. By having this arrangement the conventional way of shifting the bar 122 in one direction for low speed and in the opposite direction for reverse gear is secured.

Although but one specific embodiment of this invention has been herein shown and described, it will be understood that numerous details of the construction shown may be altered or omitted without departing from the spirit of the invention as defined by the following claims.

I claim:

1. In a transmission mechanism, a drive shaft having a gear rigid thereon, a countershaft having a gear rigid therewith constantly meshing with said drive shaft gear, a differential ring gear, a shaft for said ring gear disposed transverse to said countershaft and crossing the latter at a point intermediate its length, a pinion meshing with said ring gear, a shaft for said pinion, a gear rigid on said pinion shaft, a gear journaled on said countershaft for constantly meshing with said pinion shaft gear, a gear slidably splined on said countershaft, and means for sliding said splined gear into clutching engagement with said journaled gear.

2. In a transmission mechanism, a drive shaft having a gear rigid thereon, a countershaft having a gear rigid therewith constantly meshing with said drive shaft gear, a differential ring gear, a pinion meshing with said ring gear, a shaft for said pinion, a gear rigid on said pinion shaft, a gear journaled on said countershaft for constantly meshing with said pinion shaft gear, a gear slidably splined on said countershaft, means for sliding said splined gear into clutching engagement with said journaled gear, a gear rigid on one of said last mentioned shafts, a gear slidably splined on the other of said shafts, and means for sliding said splined gear into and out of mesh with said rigid gear.

3. In a transmission mechanism, a drive shaft having a gear rigid thereon, a countershaft having a gear rigid therewith constantly meshing with said drive shaft gear, a differential ring gear, a pinion meshing with said ring gear, a shaft for said pinion, a gear rigid on said pinion shaft, a gear journaled on said countershaft for constantly meshing with said pinion shaft gear, a gear slidably splined on said countershaft, means for sliding said splined gear into clutching engagement with said journaled gear, a gear rigid on said countershaft, a gear slidably splined on said pinion shaft, and means for sliding said splined gear into and out of mesh with said rigid gear.

4. In a transmission mechanism, a differential housing a ring gear and differential mechanism journaled in said housing, a drive shaft extending into one side of said housing with the axis thereof parallel to the plane of rotation of said ring gear, a pinion shaft extending into the opposite side of said housing with a pinion thereon meshing with said ring gear, a countershaft journaled in spaced parallel relation to said pinion shaft, constantly meshing gears rigid on said drive and countershafts, a gear rigid on said countershaft, a gear slidably splined on said pinion shaft, means for sliding said splined gear into and out of mesh with said rigid gear, a gear rigid on said pinion shaft, a gear journaled on said countershaft, a gear slidably splined on said countershaft, and means for sliding said last mentioned gear into and out of clutching engagement with said journaled gear.

5. In a transmission mechanism, a differential housing a ring gear and differential mechanism journaled in said housing, a drive shaft extending into one side of said housing with the axis thereof parallel to the plane of rotation of said ring gear, a pinion shaft extending into the opposite side of said housing with a pinion thereon meshing with said ring gear, a countershaft journaled in spaced parallel relation to said pinion shaft, constantly meshing gears rigid on said drive and countershafts, a gear splined on said countershaft, a gear slidably splined on said pinion shaft, a reverse gear constantly meshing with said countershaft splined gear, and means for shifting said pinion shaft slidably splined gear into and out of mesh with said reverse gear.

6. In a transmission mechanism, a differential housing a ring gear and differential mechanism journaled in said housing, a drive shaft extending into one side of said housing with the axis thereof parallel to the plane of rotation of said ring gear, a pinion shaft extending into the opposite side of said housing with a pinion thereon meshing with said ring gear, a countershaft journaled in spaced parallel relation to said pinion shaft, constantly meshing gears rigid on said drive and countershafts, a gear rigid on said countershaft, a gear slidably splined on said pinion shaft, means for sliding said splined gear into and out of mesh with said rigid gear, a gear rigid on said pinion shaft, a gear journaled on said countershaft, a gear slidably splined on said countershaft, means for sliding said last mentioned gear into and out of clutching engagement with said journaled gear, an intermediate shaft having one end splined in said pinion and the other end piloted in said drive shaft, and means for axially sliding said intermediate shaft into and out of clutching engagement with said drive shaft.

7. In a transmission mechanism, a differential housing a ring gear and differential mechanism journaled in said housing, a drive shaft extending into one side of said housing with the axis thereof parallel to the plane of rotation of said ring gear, a pinion shaft extending into the opposite side of said housing with a pinion thereon meshing with said ring gear, a countershaft journaled in spaced parallel relation to said pinion shaft, constantly meshing gears rigid on said drive and countershafts, a gear splined on said countershaft, a gear slidably splined on said pinion shaft, a reverse gear constantly meshing with said countershaft splined gear, means for shifting said pinion shaft slidably splined gear into and out of mesh with said reverse gear, an intermediate shaft having one end splined in said pinion and the other end piloted in said drive shaft, and means for axially sliding said intermediate shaft into and out of clutching engagement with said drive shaft.

REX E. WELLS.